(No Model.)

J. A. EASTMAN.
RIM JOINT AND SPOKE SOCKET FOR VEHICLE WHEELS.

No. 381,121. Patented Apr. 17, 1888.

Witnesses:
M. N. Wardwell,
P. H. J. Lander.

Inventor,
John A. Eastman.

United States Patent Office.

JOHN A. EASTMAN, OF BANGOR, MAINE, ASSIGNOR OF ONE-HALF TO CHARLES E. HILL, OF SAME PLACE.

RIM-JOINT AND SPOKE-SOCKET FOR VEHICLE-WHEELS.

SPECIFICATION forming part of Letters Patent No. 381,121, dated April 17, 1888.

Application filed August 11, 1887. Serial No. 246,727. (No model.)

*To all whom it may concern:*

Be it known that I, JOHN A. EASTMAN, a citizen of the United States, residing at Bangor, in the county of Penobscot and State of Maine, have invented a new and useful Combined Felly-Plate and Rim-Joint Cover; and I do hereby declare that the following is a full, clear, and exact description of the invention, which will enable others skilled in the art to which it appertains to make and use the same.

The object of my invention is to provide a combined felly-plate and rim-joint cover that will strengthen and make the joint in the rim or fellies come either directly over or near the end of the spoke where it extends through the rim. This prevents the breaking down or flattening of the rim between the spokes at the joint, also the loosening of the tire, as is invariably the case in vehicle-wheels now manufactured and used.

In the description reference is made to the accompanying drawings, in which—

Figure 1:
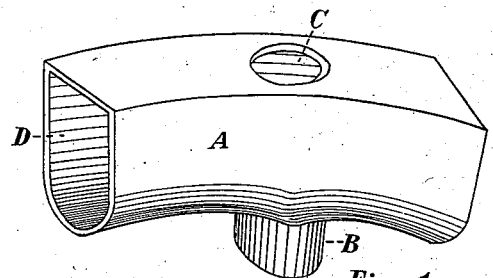
Figure 2:
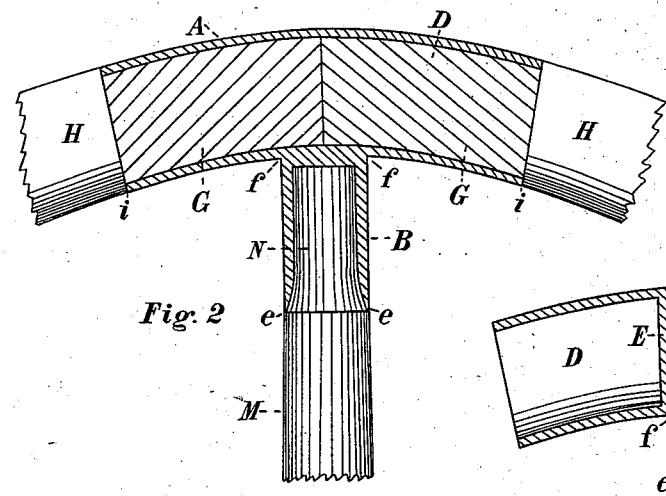
Figure 5:
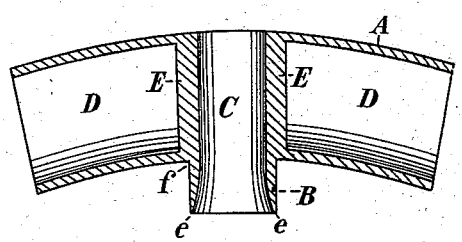
Figure 3:
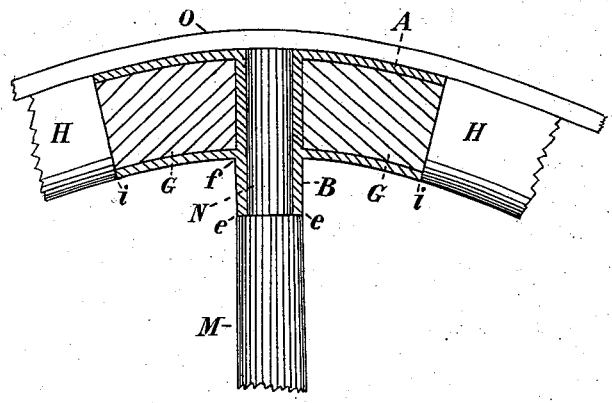
Figure 4:
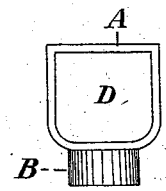

Figure 1 is a perspective view of my combined felly-plate and rim-joint cover. Fig. 2 is a section cut longitudinally through the felly-plate and joint-cover, showing the method of making the rim-joint directly over the spoke. Fig. 3 is a similar section of the felly-plate and rim-joint cover, showing the end of the spoke extending through the rim at the joint. Fig. 4 is an end view of the combined felly-plate and rim-joint cover. Fig. 5 is a longitudinal section of the felly and rim-joint cover having the ends of the rim or felly stop each side of the spoke.

Similar letters of reference refer to corresponding parts throughout the several figures.

My invention consists of a combined felly-plate and rim-joint cover applicable to all kinds of vehicle-wheels, and is composed of a hollow wrought-iron or metallic casting, A, curved to agree with the periphery of the wheel and to receive the ends of the rim or fellies H H. Cast upon the under side of this rim-joint cover A is a projecting collar, B, into which the end of the spoke M passes. The outside of the collar B is made the same size as the spoke M, which necessitates a shoulder at $e$ and a rimming down of the spoke end N where it enters the collar B.

To prevent weakening the spoke as much as possible where it enters the collar B, I have rimmed out the inside of the collar B, reducing it to a feather-edge at $e$. This makes a funnel-shaped opening for the reception of the end of the spoke, gradually reducing the latter, allowing it to be driven firmly into the opening or socket C, filling said socket to perfection. In this manner by gradually reducing the end of the spoke I strengthen the same where it enters the rim, as what is taken off from the spoke is made up by the funnel-shaped collar B. I get rid of the dangerous shoulder on the spoke where it enters the rim, as spokes invariably break first at this junction. I make a stronger union of the spoke to the rim than is possible in any other way consistent with neatness.

The spoke-socket C of my device extends completely through the rim-joint cover A, allowing the end of the spoke to have a solid flat bearing against the tire of the wheel when finished.

The rim-joint cover A is cast to the form of a section of a wheel rim or felly. The outside being the same size as the latter, the rim or felly must necessarily be shouldered at $i$, where it enters the joint-cover, forming a tenon, G G, closely fitting the inside of the same. The ends of the rim or fellies butt against the solid metal E E around the spoke-socket C.

I am aware of Patent No. 172,422, and I do not intend nor seek to claim anything shown in said patent; but What I do claim, and desire to secure by Letters Patent, is—

1. A metallic wheel-joint connection consisting of a hollow T-shaped casting, A, having a spoke-socket, C, passing completely through its center extending into a collar, B, on the under side of the rim, substantially as shown and described.

2. The combination of a rim-joint connection consisting of a metallic casing entirely inclosing the ends of the rim or fellies and conforming to the curve thereof, with a spoke-socket consisting of a ferrule or collar, B, cast upon the under side of the rim-joint cover A, having its inner edges chamfered to receive the spoke, substantially as and for the purpose described.

JOHN A. EASTMAN.

Witnesses:
M. H. WARDWELL,
F. H. CLERGUE.